No. 749,651. PATENTED JAN. 12, 1904.
J. WIEBE.
TREADLE MECHANISM FOR LIGHT MACHINERY.
APPLICATION FILED MAY 16, 1903.
NO MODEL.

WITNESSES:
O. C. Abbott
Rev. G. Hester

INVENTOR
John Wiebe
BY Munn
ATTORNEYS.

No. 749,651. Patented January 12, 1904.

UNITED STATES PATENT OFFICE.

JOHN WIEBE, OF WHITEWATER, KANSAS.

TREADLE MECHANISM FOR LIGHT MACHINERY.

SPECIFICATION forming part of Letters Patent No. 749,651, dated January 12, 1904.

Application filed May 16, 1903. Serial No. 157,394. (No model.)

*To all whom it may concern:*

Be it known that I, JOHN WIEBE, a citizen of the United States, and a resident of Whitewater, in the county of Butler and State of Kansas, have invented a new and Improved Treadle Mechanism for Light Machinery, of which the following is a full, clear, and exact description.

The object of the invention is to provide a new and improved treadle mechanism more especially designed for use on washing-machines, churns, and other light machinery, the mechanism being arranged to enable the operator to turn the main shaft of the machine to be driven for a considerable length of time without much physical exertion on the part of the operator.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
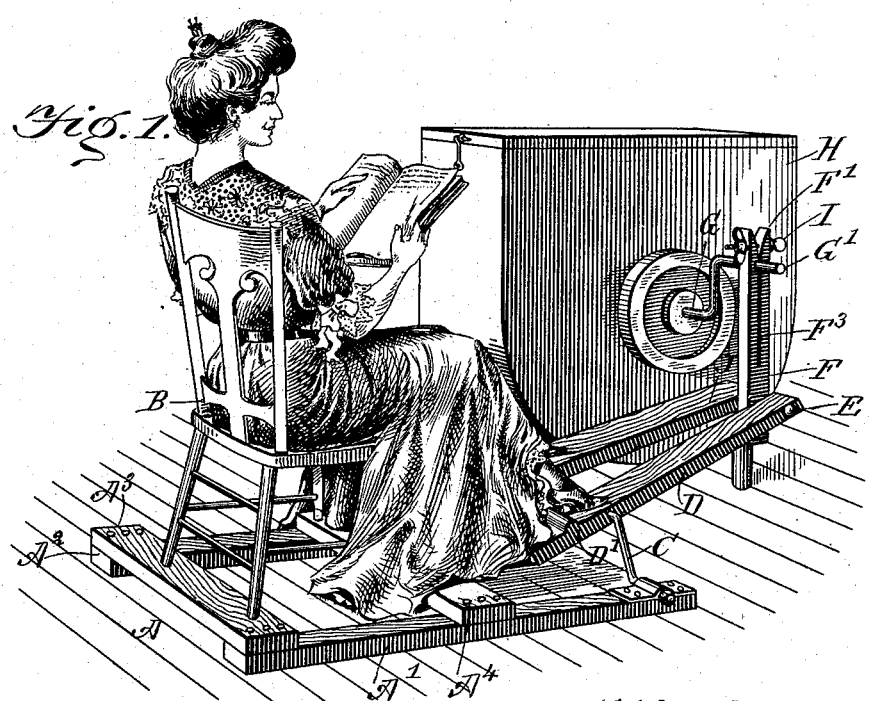
Figure 2:
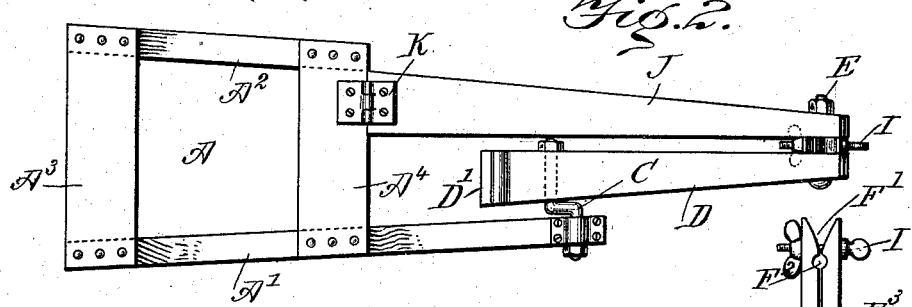
Figure 3:
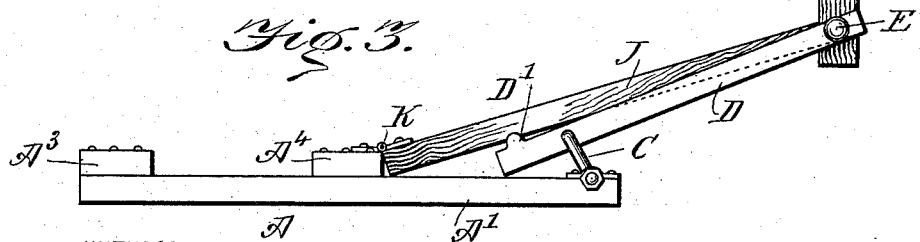

Figure 1 is a perspective view of the improvement in use for actuating a washing-machine. Fig. 2 is a plan view of the improvement, and Fig. 3 is a side elevation of the same.

The improved treadle mechanism is preferably mounted on a skeleton frame A, formed by longitudinal beams $A'$ and $A^2$, adapted to rest on the floor and connected with each other by cross-bars $A^3$ and $A^4$, adapted to support the legs of a chair B or the like, on which the operator is seated while working the treadle mechanism.

On the forward end of the longitudinal beam $A'$ is journaled a crank C, forming, with its wrist-pin, the fulcrum for a treadle-lever D, pivotally connected at its forward end with a pivot-pin E, held on the lower end of a link F, removably engaging a crank $G'$ on the main shaft G of a washing-machine H or other light machine to be driven by the treadle mechanism. As shown in the drawings, the upper end of the link F is preferably forked and formed with an aperture $F^2$ for the crank-arm $G'$, and from the bottom of the aperture $F^2$ leads downwardly a slot $F^3$ to render the forked members of the link sufficiently flexible to spread the forks apart when engaging the link with the crank-arm $G'$ or removing it therefrom. A bolt I connects the members of the fork with each other above the crank-arm $G'$ after the latter engages the aperture $F^2$, so as to hold the link properly in position on the crank-arm $G'$. The bolt I is preferably provided with a wing-nut to allow the operator to conveniently remove the bolt I or fasten the same in position on the link when attaching the link to or detaching it from the crank-arm $G'$.

The pivot-pin E, previously mentioned, is also engaged by the forward end of a second treadle-lever J, connected at its rear end by a hinge K with the cross-bar $A^4$, the said treadle-lever J being somewhat longer than the treadle-lever D and the latter being provided at its rear end with a foot-piece $D'$, adapted to be engaged by one foot of the operator, the other foot being used on the treadle-lever J.

Now it will be seen that when the foot-piece $D'$ is pressed by the operator then the forward end of the treadle-lever D swings upward to move the link F and crank-arm $G'$ in a like direction, and when the treadle-lever J is pressed by the other foot of the operator then a downward movement is imparted to the said parts, so that a continuous rotary motion is given to the main shaft G of the washing-machine H or other machine to be driven by the operator alternately pressing the levers D and J in the manner described.

It is necessary for the proper working of the device that the end of the treadle-lever D connected with the pivot-pin E should in its up-and-down movement describe an arc similar to that described by the corresponding end of the treadle-lever J. The crank C forms a rocking fulcrum for the treadle D and permits of this movement.

The device is very simple and durable in construction and can be readily connected with the machine to be driven or disconnected therefrom and removed and stored away until again required for its legitimate purpose.

Having thus described my invention, I claim as new and desire to secure by Letters Patent—

1. A treadle mechanism for light machinery, comprising a link for connection with the part to be turned, two treadle-levers, a pivot extending through both of said treadle-levers at their forward ends and connecting them with the said link, one of the levers being hinged, and a crank-arm on which the other lever is fulcrumed, the crank-arm being located forward of the hinge of the first-mentioned lever, as set forth.

2. A treadle mechanism for light machinery, comprising a frame, having a forwardly-extending member at one side thereof, a crank-arm journaled at the front end of said member, a treadle-lever fulcrumed on the said crank-arm, in front of its foot-piece, a link pivotally connected with the forward end of the said treadle-lever and arranged for removable connection with the part to be turned, and a second treadle-lever mounted at its forward end on the pivot connecting the first treadle-lever with the link, and extending rearwardly beyond the rear end of the first-mentioned lever, the rear end of said second lever being hinged to the frame as set forth.

3. A treadle mechanism comprising a frame, a link for connection with the part to be turned, two treadle-levers both pivotally connected at one end by a common pivot with the link, one of said treadle-levers being hinged at its other end to the frame and the other treadle-lever being shorter than the first-mentioned lever and having its fulcrum mounted to rock on the frame, the rear end of said lever extending beyond the fulcrum and provided with a foot-piece, as set forth.

4. A treadle mechanism, comprising a frame having a forwardly-extending member at one side thereof, a treadle-lever having its fulcrum mounted to rock on the said member, the said treadle-lever having a foot-piece at the rear of the fulcrum, a link arranged for removable connection with the part to be turned and pivotally connected with the forward end of said treadle-lever, a second treadle-lever pivoted at its forward end on the said link-pivot, the said lever being longer than the first-mentioned lever and hinged at its rear end to the said frame, as set forth.

In testimony whereof I have signed my name to this specification in the presence of two subscribing witnesses.

JOHN WIEBE.

Witnesses:
J. D. JOSEPH,
G. P. NEIMAN.